(12) United States Patent
Wang et al.

(10) Patent No.: US 11,972,604 B2
(45) Date of Patent: Apr. 30, 2024

(54) IMAGE FEATURE VISUALIZATION METHOD, IMAGE FEATURE VISUALIZATION APPARATUS, AND ELECTRONIC DEVICE

(71) Applicant: SHENZHEN INSTITUTES OF ADVANCED TECHNOLOGY, Guangdong (CN)

(72) Inventors: Shuqiang Wang, Guangdong (CN); Wen Yu, Guangdong (CN); Chenchen Xiao, Guangdong (CN); Shengye Hu, Guangdong (CN); Yanyan Shen, Guangdong (CN)

(73) Assignee: SHENZHEN INSTITUTES OF ADVANCED TECHNOLOGY, Guangdong (CN)

( * ) Notice: Subject to any disclaimer, the term of this patent is extended or adjusted under 35 U.S.C. 154(b) by 489 days.

(21) Appl. No.: 17/283,199

(22) PCT Filed: Mar. 11, 2020

(86) PCT No.: PCT/CN2020/078731
§ 371 (c)(1),
(2) Date: Apr. 6, 2021

(87) PCT Pub. No.: WO2021/179198
PCT Pub. Date: Sep. 16, 2021

(65) Prior Publication Data
US 2022/0148293 A1    May 12, 2022

(51) Int. Cl.
*G06V 10/82*    (2022.01)
*G06V 10/774*    (2022.01)

(52) U.S. Cl.
CPC .......... *G06V 10/82* (2022.01); *G06V 10/7747* (2022.01)

(58) Field of Classification Search
None
See application file for complete search history.

(56) References Cited

U.S. PATENT DOCUMENTS 9,542,609 B2    1/2017   Wu et al.

FOREIGN PATENT DOCUMENTS

| CN | 109800697 | 5/2019 |
|---|---|---|
| CN | 109885667 | 6/2019 |

(Continued)

OTHER PUBLICATIONS

J. Liu, C. Wang, H. Su, B. Du and D. Tao, "Multistage GAN for Fabric Defect Detection," in IEEE Transactions on Image Processing, vol. 29, pp. 3388-3400, 2020, doi: 10.1109/TIP.2019.2959741. (Year: 2020).*

(Continued)

*Primary Examiner* — Vincent Rudolph
*Assistant Examiner* — Meredith I Taylor
(74) *Attorney, Agent, or Firm* — CANTOR COLBURN LLP

(57) ABSTRACT

An image feature visualization method and apparatus, and an electronic device during model training, inputs the real training data with positive samples into a mapping generator to obtain fictitious training data with negative samples. The mapping generator includes a mapping module configured to learn a key feature map that distinguishes the real training data with positive samples/negative samples, and the fictitious training data with negative samples is generated based on the real training data with positive samples and the key feature map. The training data with negative samples is input into a discriminator to obtain a discrimination result. An optimizer optimizes the mapping generator and the discriminator until training is completed. During model application, a target image that is to be processed is input into the (Continued)

mapping generator, and the mapper in the mapping generator extracts features of the target image.

12 Claims, 4 Drawing Sheets

(56) References Cited

FOREIGN PATENT DOCUMENTS

| CN | 110347819 | 10/2019 |
|---|---|---|
| CN | 110569721 | 12/2019 |

OTHER PUBLICATIONS

C. Zhang et al., "MS-GAN: GAN-Based Semantic Segmentation of Multiple Sclerosis Lesions in Brain Magnetic Resonance Imaging," 2018 Digital Image Computing: Techniques and Applications (DICTA), Canberra, ACT, Australia, 2018, pp. 1-8, doi: 10.1109/DICTA.2018. 8615771. (Year: 2018).*

Li X, Lei L, Sun Y, Li M, Kuang G. Multimodal bilinear fusion network with second-order attention-based channel selection for land cover classification. IEEE Journal of Selected Topics in Applied Earth Observations and Remote Sensing. Mar. 2, 2020;13:1011-26. ( Year: 2020).*

International Search Report for PCT/CN2020/078731 dated Dec. 14, 2020, 4 pages.

* cited by examiner

IMAGE FEATURE VISUALIZATION METHOD, IMAGE FEATURE VISUALIZATION APPARATUS, AND ELECTRONIC DEVICE

CROSS REFERENCE TO RELATED APPLICATIONS

This application is a National Stage of PCT Application No. PCT/CN2020/078731 filed on Mar. 11, 2020, the content of which is incorporated herein by reference thereto.

TECHNICAL FIELD

The present application involves the field of medical image data processing technologies, and particularly relates to an image feature visualization method, an image feature visualization apparatus, an electronic device and a computer-readable storage medium.

BACKGROUND

In the field of medical image processing technologies, the FMRI (Functional Magnetic Resonance Imaging) technology is a comparatively mainstream non-invasive technology, which can perform positioning accurately for a specific active cerebral cortex, and is able to acquire blood oxygen changes that are capable of reflecting neuronal activities.

Technical Problem

At present, when feature extraction is performed on an FMRI image to achieve feature visualization, deep learning visualization methods are often used in a form of a thermodynamic chart to visualize the FMRI image, which will cause that tiny texture features of the active cerebral cortex is easily ignored by an acquired visualization result, thereby affecting the quality of the visualization result.

SUMMARY

The present application provides an image feature visualization method, an image feature visualization apparatus, an electronic device and a computer-readable storage medium, which can improve the quality of the visualization result of medical images.

According to a first aspect, an embodiment of the present application provides an image feature visualization method, which includes:
  acquiring training comparison data, wherein the training comparison data includes real training data with positive samples and real training data with negative samples;
  inputting the real training data with positive samples into a mapping generator that is to be trained to obtain fictitious training data with negative samples output by the mapping generator that is to be trained, wherein the mapping generator includes a mapping module configured to learn a key feature map that distinguishes the real training data with positive samples and the real training data with negative samples, and the fictitious training data with negative samples is generated by the mapping generator based on the real training data with positive samples and the key feature map;
  inputting training data with negative samples into a discriminator that is to be trained to obtain a discrimination result output by the discriminator, wherein the training data with negative samples includes the real training data with negative samples and the fictitious training data with negative samples;
  optimizing the mapping generator that is to be trained and the discriminator that is to be trained based on the discrimination result, and returning to execute the step of acquiring the training comparison data and the subsequent steps until training is completed.
  inputting a target image that is to be processed into the trained mapping generator, and extracting features of the target image through the mapping module in the trained mapping generator, so as to realize feature visualization of the target image.

According to a second aspect, the present application provides an image feature visualization apparatus, which includes:
  an acquisition unit configured to acquire training comparison data, wherein the training comparison data includes real training data with positive samples and real training data with negative samples;
  a generator execution unit configured to input the real training data with positive samples into a mapping generator that is to be trained to obtain fictitious training data with negative samples output by the mapping generator that is to be trained, wherein the mapping generator includes a mapping module configured to learn a key feature map that distinguishes the real training data with positive samples and the real training data with negative samples, and the fictitious training data with negative samples is generated by the mapping generator based on the real training data with positive samples and the key feature map;
  a discriminator execution unit configured to input training data with negative samples into a discriminator that is to be trained to obtain a discrimination result output by the discriminator, wherein the training data with negative samples includes the real training data with negative samples and the fictitious training data with negative samples; and an optimization unit configured to optimize the mapping generator that is to be trained and the discriminator that is to be trained based on the discrimination result, and configured to return to execute the step of acquiring the training comparison data and the subsequent steps until training is completed;
  wherein the application module is configured to input a target image that is to be processed into the trained mapping generator, and extract features of the target image through the mapping module in the trained mapping generator, so as to realize feature visualization of the target image.

A third aspect of the present application provides an electronic device, which includes a memory, a processors, and a computer program stored in the memory and executable on the processor, wherein the processor, when executing the computer program, implements the steps of the method according to the first aspect.

A fourth aspect of the present application provides a computer-readable storage medium in which a computer program is stored, wherein the computer program, when executed by a processor, implements the steps of the method according to the first aspect.

A fifth aspect of the present application provides a computer program product including a computer program, wherein the computer program, when executed by one or more processors, implements the steps of the method according to the first aspect.

Beneficial Effects

It can be seen from the above that, in the technical solutions of the present application, the GAN needs to be trained first, which is specifically embodied as the follows: acquire training comparison data, wherein the training comparison data includes real training data with positive samples and real training data with negative samples; then input the real training data with positive samples into the mapping generator that is to be trained to obtain fictitious training data with negative samples output by the mapping generator that is to be trained, wherein the mapping generator includes the mapping module configured to learn the key feature map that distinguishes the real training data with positive samples and the real training data with negative samples, and the fictitious training data with negative samples is generated by the mapping generator based on the real training data with positive samples and the key feature map; next input training data with negative samples into the discriminator that is to be trained to obtain the discrimination result output by the discriminator, wherein the training data with negative samples includes the real training data with negative samples and the fictitious training data with negative samples; finally optimize the mapping generator that is to be trained and the discriminator that is to be trained based on the discrimination result, and return to execute the step of acquiring the training comparison data and the subsequent steps until training is completed. After the GAN is completed the training, then the GAN is applied, which is specifically embodied as the follows: input the target image that is to be processed into the trained mapping generator, and extract features of the target image through the mapping module in the trained mapping generator, so as to realize feature visualization of the target image. By using the technical solutions of the present application, the traditional GAN is improved, and the traditional generator is improved into the mapping generator including the mapping module, which is configured to learn the key feature map that distinguishes the real training data with positive samples and the real training data with negative samples. In the training process, through continuous generative adversarial training and improvement of the extraction accuracy of the mapping generator, so that the features of the medical image can be better extracted and the quality of the visualization result of the medical image can be improved when the mapping generator in the GAN is applied. It can be appreciated that, the beneficial effects of from the second aspect to the fifth aspect may refer to related description of the first aspect, which will not be repeated again herein.

DESCRIPTION OF THE DRAWINGS

In order to more clearly illustrate technical solutions in embodiments of the present application, drawings needed to be used in the description for the embodiments or the prior art will be briefly introduced below. Obviously, the drawings in the following description are only some embodiments of the present application, and those of ordinary skill in the art can obtain other drawings based on these drawings without creative work.

EMBODIMENTS OF THE PRESENT APPLICATION

In the following description, for the purpose of illustration rather than limitation, specific details such as a specific system structure, a specific technology, etc. are proposed for a thorough understanding of the embodiments of the present application. However, it should be clear to those skilled in the art that the present application can also be implemented in other embodiments without these specific details. In other cases, detailed descriptions of a well-known system, apparatus, circuit, and method are omitted to avoid unnecessary details from obstructing the description of the present application.

It should be understood that, when used in the specification and appended claims of the present application, the term "comprising" indicates existence of a described feature, whole, step, operation, element and/or component, but does not exclude existence or addition of one or more of other features, wholes, steps, operations, elements, components, and/or combinations thereof.

It should also be understood that, the term "and/or" used in the specification and appended claims of the present application refers to any combination and all possible combinations of one or more of items listed with association, and includes these combinations.

As used in the specification and the appended claims of the appended application, the term "if" can be construed as "when" or "once" or "in response to determination" or "in response to detecting" according to its context. Similarly, the phrase "if . . . is determined" or "if [a described condition or event] is detected" can be interpreted as meaning "once . . . is determined" or "in response to determination" or "once [a described condition or event] is detected" or "in response to detection of [a described condition or event]" depending on its context.

In addition, in the description of the specification and the appended claims of the present application, the terms "first", "second", "third", etc. are only used to distinguish the description, and cannot be understood as indicating or implying relative importance.

The reference to "one embodiment" or "some embodiments" described in the specification of the present application means that one or more embodiments of the present application include a specific feature, structure, or characteristic described in combination with this embodiment. Therefore, all the phrases "in one embodiment", "in some embodiments", "in some other embodiments", "in some additional embodiments", etc. appearing in different places of the present specification are not necessarily refer to the same embodiment, but mean "one or more embodiments but not all embodiments", unless otherwise specifically emphasized in other ways. The terms "comprising", "including", "having" and their variations all mean "including but being not limited to", unless otherwise specifically emphasized in other ways.

First Embodiment

Figure 1:
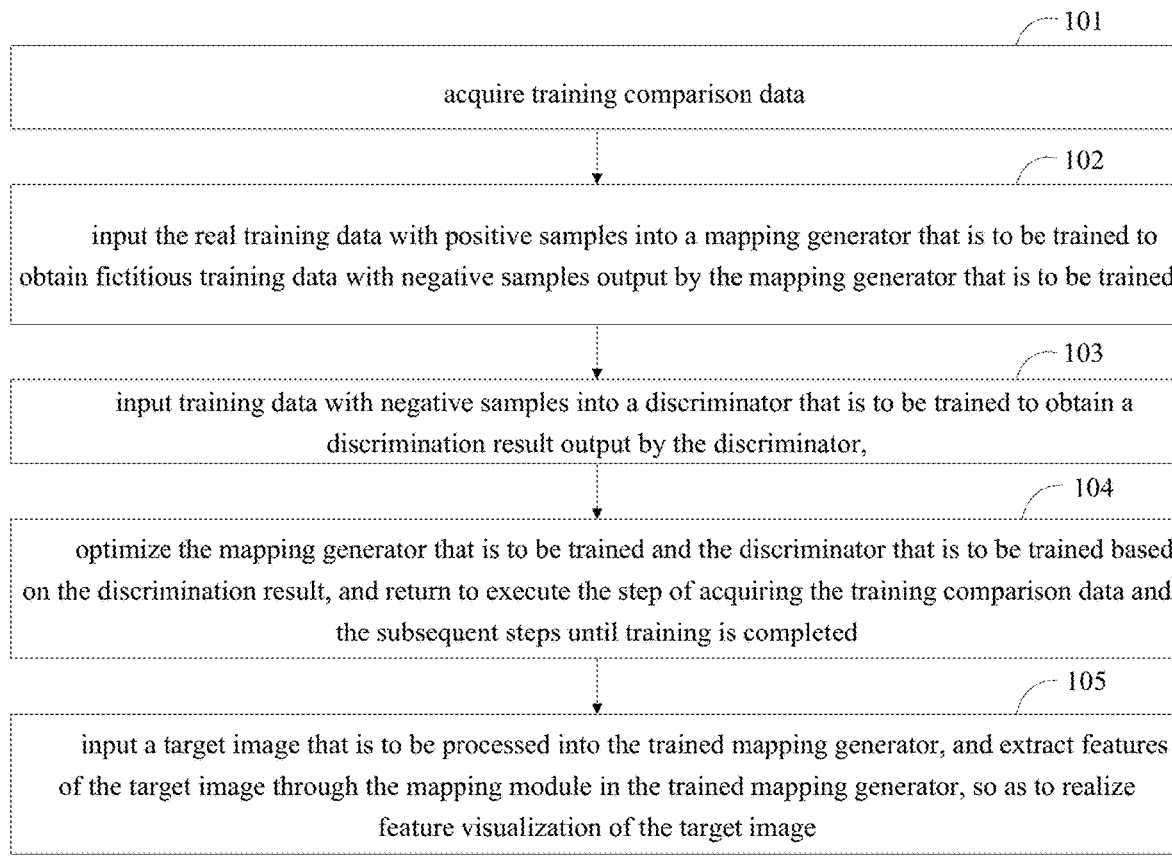
FIG. 1 is a schematic diagram of an implementation process of the image feature visualization method provided by an embodiment of the present application.

The image feature visualization method proposed in an embodiment of the present application mainly involves two aspects: the first aspect involves training of a GAN (Generative Adversarial Network), and the second aspect involves application of the GAN. Specifically, referring to FIG. 1, steps from 101 to 104 are related to the training process of the GAN, and step 105 is related to the application process of the GAN. The image feature visualization method proposed in this embodiment of the present application is described below, which includes the following.

At step 101, acquire training comparison data;

In an embodiment of the present application, the training comparison data may be acquired first, so as to realize training the GAN through the training comparison data. Specifically, the above-mentioned training comparison data includes two types of data, which are real training data with positive samples and real training data with negative samples. Among them, the terms "positive sample" and "negative sample" are used to indicate training data acquired under different experimental conditions that are contrasted with each other, and the word "real" is used to indicate that the training data is data acquired through an actual scene but not fictitious data edited by a machine. It should be noted that the above-mentioned training comparison data may be acquired by processing original comparison data, which may be specifically embodied as: obtain the original comparison data, here the original comparison data includes real original data with positive samples and real original data with negative samples; subsequently, normalize the real original data with positive samples and the real original data with negative samples, determine the normalized real original data with positive samples as the real training data with positive samples, and determine the normalized real original data with negative samples as the real training data with negative samples, here each of voxel values of the real training data with positive samples and the real training data with negative samples is within a preset numerical range, just as an example, the numerical range may be [−1, 1]. The above normalization process is to prevent the gradient from disappearing or exploding during the training.

In order to better understand this step, the following takes the visualization of an encephalic region specificity loop of a rat with nicotine addiction as an example. During training, the FMRI images of rats under the action of different concentrations of nicotine are used as comparative experimental data. There may be the following sets of experimental conditions: (1) inject 0.12 mg/kg of high-concentration nicotine; (2) inject 0.03 mg/kg of low-concentration nicotine; (3) inject physiological saline. The research staff may normalize the FMRI images acquired by any two sets of experimental conditions among the three sets of experimental conditions according to actual needs to acquire training pair data. For example, the normalized rat FMRI image acquired after the injection of 0.03 mg/kg of low-concentration nicotine may be used as the real training data with positive samples, and the normalized rat FMRI image acquired after the injection of the physiological saline may be used as the real training data with negative samples, which will not be limited here.

At step 102, input the real training data with positive samples into a mapping generator that is to be trained, and obtain fictitious training data with negative samples output by the mapping generator that is to be trained.

In an embodiment of the present application, in the training process of the GAN, the real training data with positive samples may be used as the input data and input into the mapping generator provided with a mapping module. The obtained output data of the mapping generator is specifically the fictitious training data with negative samples, here the word "fictitious" in the term "fictitious training data with negative samples" is opposite to the word "real" in the terms "real training data with positive samples" and "real training data with negative samples" in the above step 101, and is used to indicate that the training data is fictitious data edited by a machine. Among them, the mapping module of the mapping generator may be used to extract features of the input data (it is the real training data with positive samples in the training process; and it is the target image in the application process) of the mapping generator, specifically, in the training process, the mapping module can learn a key feature map that distinguishes the real training data with positive samples and the real training data with negative samples. The fictitious training data with negative samples may be generated by the mapping generator based on the real training data with positive samples and the key feature map.

Optionally, the foregoing step 102 specifically includes the following.

A1, compress the real training data with positive samples into a feature vector through a convolution operation of the encoder.

Figure 2:
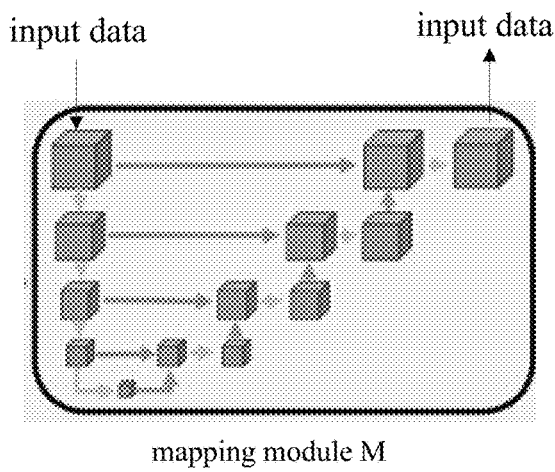
FIG. 2 is a schematic structural diagram of a mapping module of a mapping generator in the image feature visualization method provided by an embodiment of the present application.

In an embodiment of the present application, the mapping module includes an encoder and a decoder as shown in FIG. 2, its network structure is a U-Net, which can directly connect upper layer information with lower layer information of the input data through a manner of jump connection so as to make full use of underlying features of the input data. In this step, the real training data with positive samples may be recorded as $x_i$, and the real training data $x_i$ with positive samples may be compressed into an encoded feature vector through the convolution operation of the encoder.

A2, decode the feature vector through the decoder to obtain a key feature map.

In an embodiment of the present application, the decoder will further decode the feature vector to obtain a key feature $M(x_i)$ that distinguishes the positive samples and the negative samples. The key feature $M(x_i)$ is also the key feature map that distinguishes the real training data with positive samples and the real training data with negative sample.

A3, generate fictitious training data with negative samples based on the key feature map and the real training data with positive sample.

In an embodiment of the present application, since the key feature map acquired by the mapping module is the key feature map that distinguishes the real training data with positive samples and the real training data with negative samples, then the mapping generator may further process the key feature map and the real training data with positive samples so as to generate the fictitious training data $y_i$ with negative samples. Specifically, each of the voxel values of the key feature map is added to the corresponding voxel value in the real training data with positive samples, and the acquired result is the fictitious training data with negative samples. The generation process of the fictitious training data $y_i$ with negative samples may be expressed as:

$$y_i = M(x_i) + x_i \quad (1)$$

A4, output the fictitious training data with negative samples.

At step 103, input the training data with negative samples into a discriminator that is to be trained, and obtain a discrimination result output by the discriminator.

Figure 3:
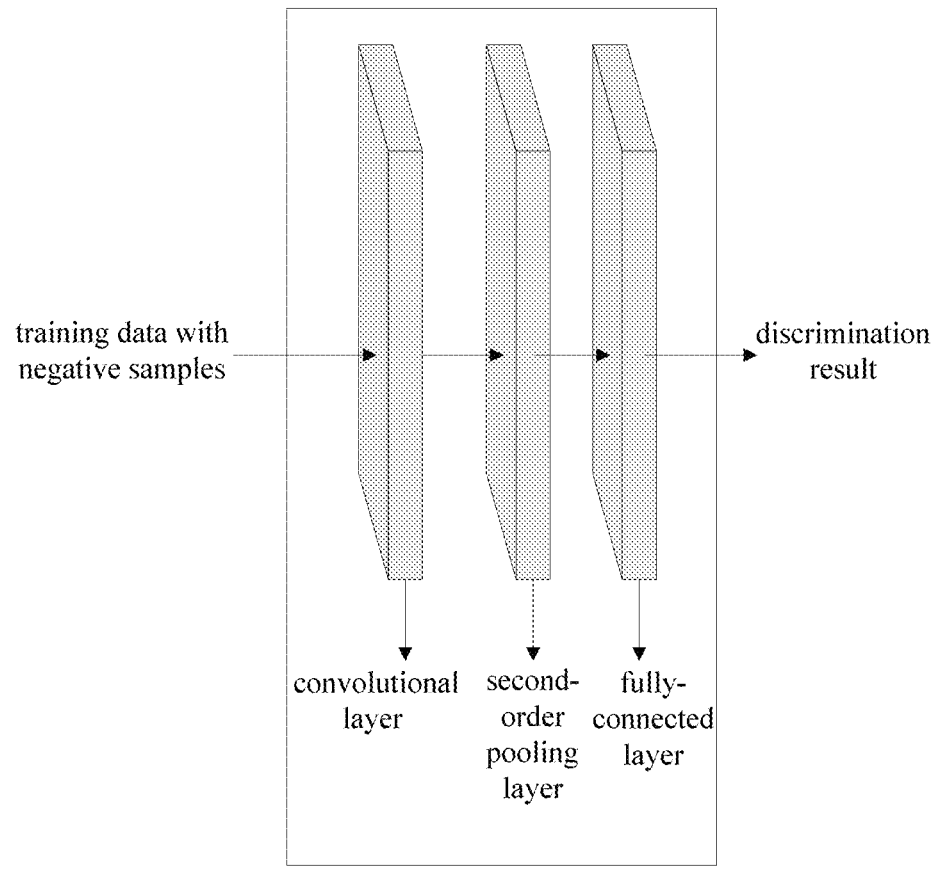
FIG. 3 is a schematic structural diagram of a discriminator in the image feature visualization method provided by an embodiment of the present application.

In an embodiment of the present application, both the real training data with negative samples and the fictitious training data with negative samples may be input as training data with negative samples into the discriminator that is to be trained. During the operation of the discriminator, one set of training data with negative samples is selected randomly or in a certain order for discrimination. Specifically, as shown in FIG. 3, the discriminator is composed of a convolutional layer, a second-order pooling layer, and a fully-connected layer, among which the convolutional layer includes a normal convolutional layer and a densely connected convolutional layer, and then the step 103 specifically includes the following.

B1, input a tensorizing expression of the training data with negative samples into the discriminator that is to be trained.

In an embodiment of the present application, regardless of whether the training data with negative samples is the real training data with negative samples or the fictitious training data with negative samples, it needs to be input to the discriminator in a form of the tensorizing expression. For example, for the rat FMRI image as shown in step 101, the form of the fourth-order tensor of the rat FMRI image is used as the input data of the discriminator.

B2, perform feature extraction on the tensorizing expression of the training data with negative samples through the convolutional layer to obtain a feature tensor of the training data with negative samples.

In an embodiment of the present application, the feature tensor of the training data with negative samples that is obtained through the feature extraction on the tensorizing expression of the training data with negative samples by the convolutional layer can retain sufficient spatial information and time series information. Here, the activation functions adopted by the convolutional layer of the discriminator are Leaky ReLU and Batch Normalization.

B3, perform a weighted calculation on the feature tensor of the training data with negative samples through the second-order pooling layer to obtain a weighted feature tensor of the training data with negative samples.

Figure 4:
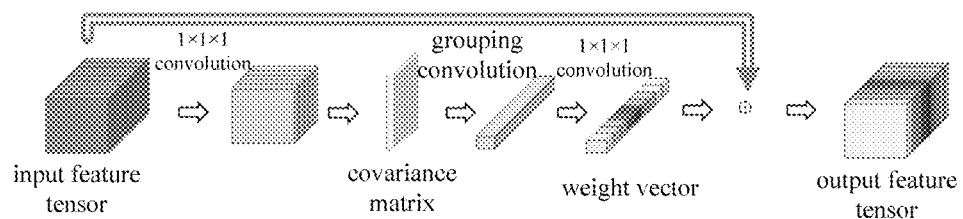
FIG. 4 is a schematic diagram of calculation of a second-order pooling layer in the image feature visualization method provided by an embodiment of the present application.

In an embodiment of the present application, as shown in FIG. 4, the step B3 specifically includes the following.

B31, perform channel dimensionality reduction on the feature tensor of the training data with negative samples.

In an embodiment of the present application, specifically, 1×1×1 convolution may be used to perform the channel dimensionality reduction on the feature tensor of the input training data with negative samples.

B32, calculate covariance information between any two channels in the feature tensor after the channel dimension reduction to obtain a covariance matrix.

B33, perform grouping convolution and 1×1×1 convolution calculation on the covariance matrix to obtain a weight vector, here the number of channels of the weight vector is the same as the number of channels of the feature tensor of the training data with negative samples.

B34, calculate inner product of the weight vector and the feature tensor of the training data with negative samples to obtain a weighted feature tensor of the training data with negative samples.

It should be noted that, during the training process of the discriminator, the channel weights will also be adjusted through a backpropagation algorithm, so that one channel that is more important in the weighted feature tensor is provided with the larger weight, and one channel that is less important in the weighted feature tensor is provided with the smaller weight, so as to extract a more representative global high-order feature map. That is, through dependence of different regions of the training data with negative samples and correlation information between the different channels of the high-order features, the second-order pooling layer can adjust the weights of the channels according to the importance under an effect of a self-attention mechanism, so as to realize the weighted calculation for the feature tensor of the training data with negative samples, thereby obtaining the weighted feature tensor of the training data with negative samples. This can help the discriminator to extract more discriminative features and improve the discriminatory ability of the discriminator.

B4, classify the weighted feature tensor of the training data through the fully-connected layer, and obtain a discrimination result of the training data with negative samples.

In an embodiment of the present application, the fully-connected layer specifically uses a sigmoid function to determine whether the input training data with negative samples is true or false, that is, to determine whether the input training data with negative samples is the real training data with negative samples or the fictitious training data with negative samples.

B5, output the discrimination result of the training data with negative samples.

Optionally, in order to reduce parameters and save storage space, before the discriminator is put into training, the image feature visualization method further includes:

C1, initializing each of network layers in the discriminator that is to be trained;

C2, compressing a convolution kernel of the convolution layer and a weight matrix of the fully-connected layer by means of tensor decomposition.

In an embodiment of the present application, the convolution kernel of the convolutional layer of the discriminator can be compressed by means of the tensor decomposition to obtain a tensorizing convolutional layer; and the weight matrix of the fully-connected layer of the discriminator can be compressed by means of the tensor decomposition to obtain a tensorizing fully-connected layer. Here, the adopted tensor decomposition method is specifically tensor-train decomposition. That is, when the discriminator is constructed, the convolution kernel of the convolutional layer and the weight matrix of the fully-connected layer has already been compressed by means of the tensor decomposition in the embodiment of the application, and the discriminator does not adopt a general convolutional layer and fully-connected layer, but the tensorizing convolutional layer and the tensorizing fully-connected layer. Specifically, when performing the tensor-train decomposition, the basic formula followed is:

$$W((i_1,j_1), \ldots, (i_d,j_d)) = G_1[i_1,j_1]G_2[i_2,j_2] \ldots G_d[i_d,j_d] \quad (2)$$

In the above formula (2), W is a weight tensor of the neural network, d is a dimension of the weight tensor, and $G_m$ is the m-th low-rank matrix in the decomposition of the weight tensor in a reconstruction network; where m=1, 2, ..., d, $i_q$ represents the size of the q-th dimension in the weight tensor of the network; where q=1, 2, ..., d; $j_k$ represents the k-th auxiliary parameter; where $j_0$=1 is used to indicate that the first order of the first low-rank matrix in the weight tensor is equal to 1, and $j_d$=1 is used to indicate that the second order of the last low-rank matrix in the weight matrix tensor is equal to 1, and k=1, 2, ..., d.

The following describes the tensorizing process of the fully-connected layer based on the tensor-train decomposition.

The weight tensor of the fully-connected layer (consisting of the input fully-connected layer and the output fully-connected layer) is tensor-train decomposed according to the above basis formula and the obtained tensorizing expression of the fully-connected layer is as follows:

$$Y(i_1, \ldots, i_d) = \Sigma_{i_1, \ldots, j_d} G_1[i_1, j_1] G_2[i_2, j_2] \ldots G_d[i_d, j_d] \chi(j_1, \ldots, j_d) + B(i_1, \ldots, i_d) \quad (3)$$

In the above formula (3), $i_1, \ldots, i_d$ are used to represent neurons of an output fully-connected layer; Y is a tensor composed of all the neurons on the output fully-connected layer; $G_1[i_1, j_1]G_2[i_2, j_2] \ldots G_d[i_d, j_d]$ is the tensorizing expression of the weight tensor of the fully-connected layer based on the tensor-train decomposition; $j_1, \ldots, j_d$ are used to represent neurons of an input fully-connected layer; X is a tensor composed of all the neurons on the input fully-connected layer; B is a tensorizing expression of a bias of the fully-connected layer.

The following describes the tensorizing process of the convolutional layer based on the tensor-train decomposition:

① An input layer of the network:

$$x(x, y, z, c) \xrightarrow{reshape} \tilde{x}(x, y, z, c_1, c_2, \cdots, c_d) \quad (4)$$

The above formula (4) is the expression of the reshape process of the input layer of the network, which refers to that the dimension of the input layer of the network is divided into 3+d dimensions from 4 dimensions; each of the parameters x, y, z, c in brackets corresponds to one dimension respectively, that is, the parameters x, y, z, and c in the brackets are only used to express data in different dimensions.

② An output layer of the Network:

$$Y(x, y, z, s) \xrightarrow{reshape} \tilde{Y}(x, y, z, s_1, s_2, \cdots, s_d) \quad (5)$$

The above formula (5) is the expression of the reshape process of the output layer of the network, which refers to that the dimension of the output layer of the network is divided from 4 dimensions into 3+d dimensions; each of the parameters x, y, z and s in brackets correspond to one dimension respectively, that is, the parameters x, y, z, and s in the brackets are only used to express data in different dimensions.

③ Convolution kernel:

$$K(x, y, z, c, s) \xrightarrow{TT\text{-}format} G_0[i, j, k] G_1[c_1, s_1] \cdots G_d[c_d, s_d] \quad (6)$$

The above formula (6) is the tensorizing expression of the convolution kernel based on the tensor-train decomposition; where the parameters in square brackets H are auxiliary parameters, which are used for mathematical calculations and have no actual meaning.

④ Based on the above formulas (4), (5) and (6), the tensorization is performed on the convolutional layer, and the following can be obtained:

$$\tilde{Y}(x,y,z,s_1,\ldots,s_d) = \Sigma_{i=1}^{1} \Sigma_{j=1}^{1} \Sigma_{k=1}^{1} \Sigma_{c_1,\ldots,c_d} \tilde{x}(i+x-1, j+y-1, k+z-1, c_1, \ldots, c_d) G_0[i,j,k] G_1[c_1, s_1] \ldots G_d[c_d, s_d] \quad (7)$$

In the above formula (7), $\tilde{Y}$ is the feature tensor output by the convolutional layer; $\tilde{X}$ is the feature tensor input into the convolutional layer; $\Sigma_{i=1}^{l} \Sigma_{j=1}^{l} \Sigma_{k=1}^{l} \Sigma_{c_1, \ldots, c_d} \tilde{X}(i+x-1, j+y-1, k+z-1, c_1, \ldots, c_d)$ is used to describe the process of extracting a next-level feature map through sliding when the convolution kernel is input into the feature tensor of the convolutional layer; $G_0[i, j, k]G_1[c_1, s_1] \ldots C_d[c_d, s_d]$ is the tensorizing expression of the convolution kernel based on the tensor-train decomposition. It should be noted that $c = \Pi_{i=1}^{d} c_1$ and $s = \Pi_{i=1}^{d} s_1$ in the above formula (7).

Through the above process, the tensor-train decomposition method is used to compress the network parameters of the convolutional layer and the fully-connected layer in the discriminator, which can comparatively retain the spatial information and time series information of the input data.

Step 104, optimize the mapping generator that is to be trained and the discriminator that is to be trained based on the discrimination result, and return to execute the step of acquiring the training comparison data and the subsequent steps until the training is completed.

In an embodiment of the present application, after the discrimination result is acquired, the mapping generator that is to be trained and the discriminator that is to be trained may be optimized through a backpropagation algorithm according to whether the discrimination result is true or false. Moreover, after each optimization, returning to the step 101 and the subsequent steps until the GAN model composed of the mapping generator and the discriminator reaches the Nash equilibrium, i.e. the training is completed. At this time, the performance of the discriminator has reached its optimal level, and the mapping generator has also learned to the greatest extent the key features that distinguish the real training data with positive samples from the real training data with negative samples.

In some embodiments, the discriminator is trained specifically through updating the kernel matrix in the network layer of the discriminator according to the gradient descent of the loss function $L_{GAN}(M, D)$ of the discriminator in the process of backpropagation, the kernel matrix may be recorded as $G_k[i_k, j_k]$ which specifically refers to the network parameters after the tensorization The goal of the discriminator is to determine the real training data with negative samples as true, and determine the fictitious training data with negative samples generated by the mapping generator as false. Based on this, the loss function $L_{GAN}(M, D)$ of the discriminator may be expressed as:

$$L_{GAN}(M,D) = E_{x \sim P_d(x|c=0)}[D(x)] - E_{x \sim P_d(x|c=1)}[D(x+M(x))] \quad (8)$$

In the above formula (8), x is the real training data with negative samples; x+M(x) is the fictitious training data with negative samples; D(x) indicates whether the discriminator determines the real training number with negative samples as true or false; D(x+M (x)) indicates whether the discriminator determines the fictitious training data with negative samples as true or false; E is the expectation, and the subscript of E is used to indicate that x complies with a conditional probability distribution under a certain condition, specifically, x~Pd(x|c=0) is used to indicate that x complies with the conditional probability distribution under c=0, and x~Pd(x|c=1) is used to indicate that x complies with the conditional probability distribution under c=1.

In some embodiments, the mapping generator is trained specifically through updating the parameters of the network layers of the mapping generator according to the gradient descent of the loss function M* of the mapping generator in the process of backpropagation. A template of the mapping generator learns to the key features that distinguish the real training data with positive samples from the real training data with negative samples, and the real training data with positive sample generates the fictitious training data with negative samples that can deceive the discriminator. In order to improve the visualization effect of medical images, a regularization constraint on the mapping function M(x) is added to the loss function M* of the mapping generator. Based on this, the loss function M* of the mapping generator may be expressed as:

$$M^* = \arg\min_{M}\max_{D\in\varphi} L_{GAN}(M, D) + \lambda L_{reg}(M) \qquad (9)$$

Where, in the above formula (9), $L_{GAN}(M, D)$ is the loss of the discriminator as shown in the above formula (8), $\varphi$ is a set of all functions that satisfy 1-Lipschitz restriction, $L_{reg}(M)=\|M(x)\|_1$ is the regularization term of the mapping function M(x).

Step 105, input a target image that is to be processed into the trained mapping generator, and extract features of the target image through the mapping module in the trained mapping generator, so as to realize the feature visualization of the target image.

In an embodiment of the present application, after the GAN training is completed and the optimal mapping generator and the optimal discriminator are acquired, the GAN can be put into application. When applying the GAN, only the mapping generator is used, specifically the mapping module in the mapping generator is applied. When there is a need for medical image analysis, this medical image, as the target image that is to be processed, is input into the trained mapping generator, and the features of this target image are extracted through the mapping module in the mapping generator, and the features are the key features that are capable of distinguishing the type of the target image, so as to realize the feature visualization of the target image.

Figure 5:
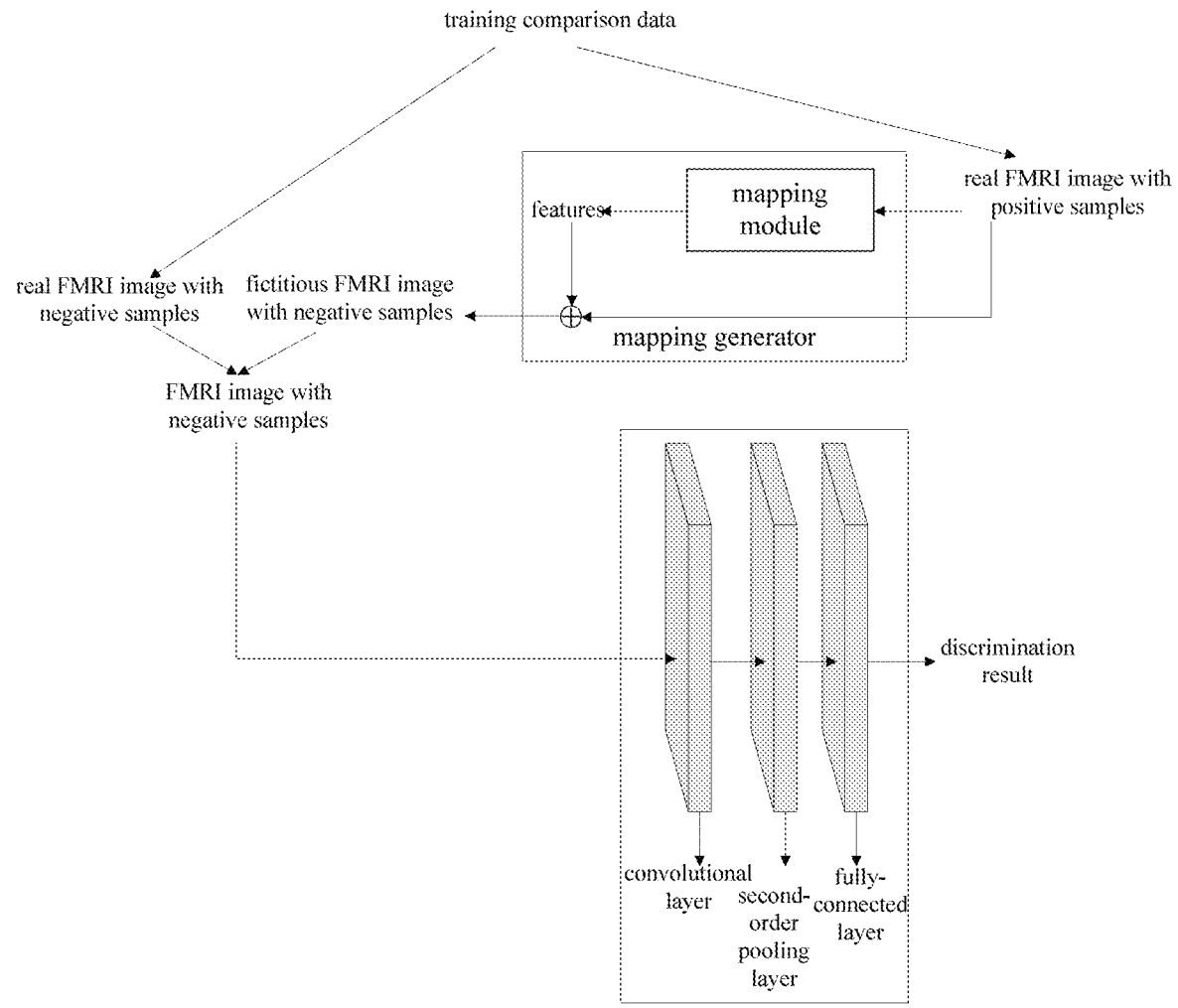
FIG. 5 is a schematic diagram of a generative adversarial network composed of the mapping generator and the discriminator in the image feature visualization method provided by an embodiment of the present application.

Please refer to FIG. 5, FIG. 5 shows a network structure of the GAN. In order to better understand this solution, the following takes the feature visualization of rat FMRI images as an example for illustration.

The data set of the FMRI images of the rats injected with different concentrations is divided into a training set and a validation set according to a ratio of 4:1. Among them, the FMRI images in the training set and the validation set have been normalized in advance. In the training process, the real FMRI images with positive samples in the training set are input as the input of the mapping generator to obtain the fictitious FMRI images with negative samples output by the mapping generator; the fictitious FMRI images with negative samples and the real FMRI images with negative samples in the training set are used as the input of the discriminator to obtain the discrimination result, and the backpropagation is performed based on the loss function of the mapping generator and the loss function of the discriminator, so as to realize the training optimization of the GAN. During each iteration of the training, the validation set is used for validation. After the iteration is completed, the optimal parameters of the GAN are selected through the verification result, and the mapping module of the mapping generator of the final GAN may be used to extract the key features that distinguish the FMRI images of rats under different concentrations of nicotine injection, thereby realizing accurate visualization of the encephalic region specificity loop of the rat with nicotine addiction.

It can be seen from the above that, in the embodiments of the present application, the traditional GAN is improved, and the traditional generator is improved into the mapping generator including the mapping module, which is configured to learn the key feature map that distinguishes the real training data with positive samples and the real training data with negative samples during training, so that the features of the input medical image can be extracted during applications, so as to realize the feature visualization of the medical image. In the training process, through continuous generative adversarial training and improvement of the extraction accuracy of the mapping generator, so that the features of the medical image can be better extracted and the quality of the visualization result of the medical image can be improved when the mapping generator in the GAN is applied; at the same time, the network parameters of the convolutional layer and the fully-connected layer in the discriminator are compressed by means of the tensor-train decomposition, so as to retain the spatial information and the time series information of the input data during the training, to achieve a regularization effect while reducing parameters and saving storage space, to avoid over-fitting of the GAN, and to enhance generalization ability of the GAN; further, the second-order pooling layer in the discriminator is used to intelligently extract more discriminative features under the action of the self-attention mechanism to improve the discriminative ability of the discriminator; further, through adding the regularization constraint of the mapping module to the loss function of the mapping generator, the mapping generator can visualize the features of irregularly shapes more accurately.

Second Example

Figure 6:
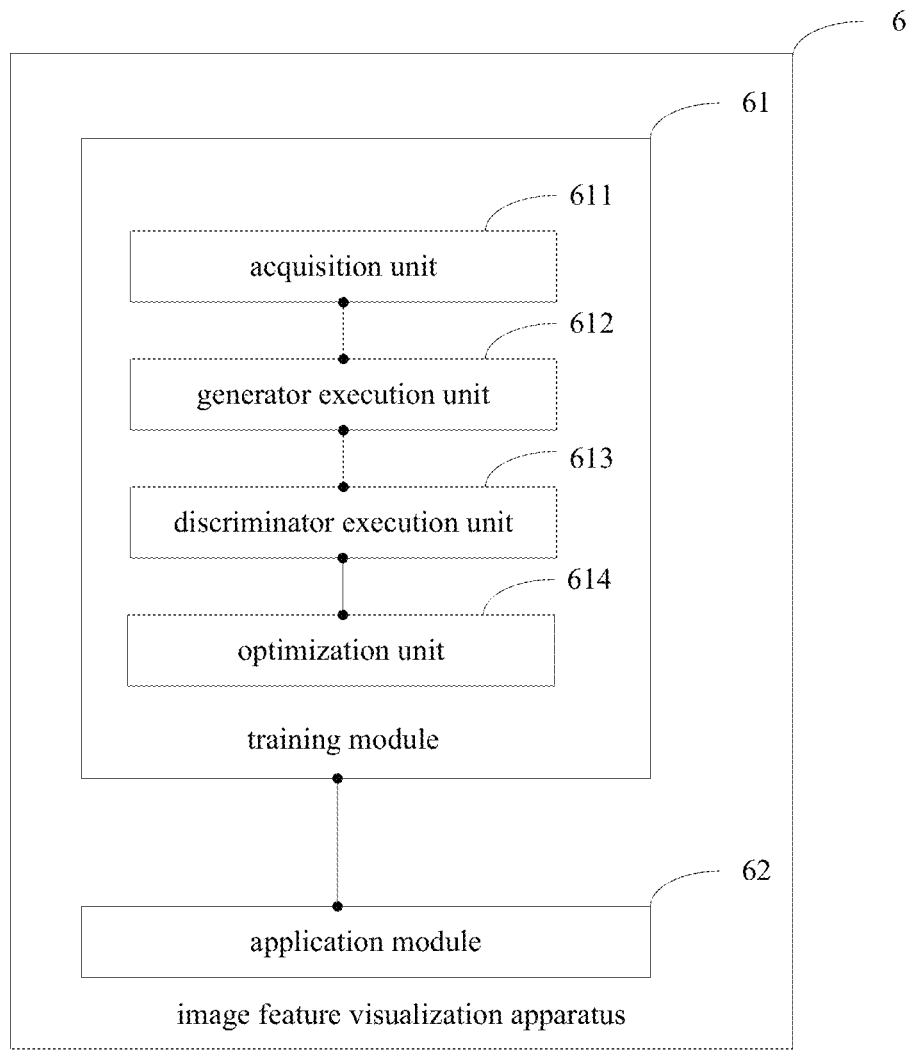
FIG. 6 is a structural block diagram of the image feature visualization apparatus provided by an embodiment of the present application.

The second embodiment of the present application provides an image feature visualization apparatus. The image feature visualization apparatus may be integrated into an electronic device. As shown in FIG. 6, the image feature visualization apparatus 6 in the embodiment of the present application includes a training module 61 and an application module 62. Among them, the training module 61 includes:
  an acquisition unit 611 configured to acquire training comparison data, here the training comparison data includes real training data with positive samples and real training data with negative samples;
  a generator execution unit 612 configured to input the real training data with positive samples into a mapping generator that is to be trained to obtain fictitious training data with negative samples output by the mapping generator that is to be trained, here the mapping generator includes a mapping module configured to learn a key feature map that distinguishes the real training data with positive samples and the real training data with negative samples, and the fictitious training data with negative samples is generated by the mapping generator based on the real training data with positive samples and the key feature map;

a discriminator execution unit 613 configured to input training data with negative samples into a discriminator that is to be trained to obtain a discrimination result output by the discriminator, here the training data with negative samples includes the real training data with negative samples and the fictitious training data with negative samples; and an optimization unit 614 configured to optimize the mapping generator that is to be trained and the discriminator that is to be trained based on the discrimination result, and configured to return to trigger execution of an acquisition unit 611 and other units until training is completed.

The application module 62 configured to input a target image that is to be processed into the trained mapping generator, and extract features of the target image through the mapping module in the trained mapping generator, so as to realize feature visualization of the target image.

Optionally, the mapping module includes an encoder and a decoder, and the generator execution unit 612 includes:
an encoding subunit configured to compress the real training data with positive samples into a feature vector through a convolution operation of the encoder;
a decoding subunit configured to decode the feature vector through the decoder to obtain the key feature map that distinguishes the real training data with positive samples and the real training data with negative sample;
a generation subunit configured to generate the fictitious training data with negative samples based on the key feature map and the real training data with positive samples;
a first output subunit configured to output the fictitious training data with negative samples.

Optionally, the generation subunit is specifically configured to add each of voxel values of the key feature map to one corresponding voxel value in the real training data with positive samples to obtain the fictitious training data with negative samples.

Optionally, network layers of the discriminator include a convolutional layer, a second-order pooling layer, and a fully-connected layer, and the discriminator execution unit includes:
an input subunit configured to input a tensorizing expression of the training data with negative samples into the discriminator that is to be trained;
an extraction subunit configured to perform feature extraction on the tensorizing expression of the training data with negative samples through the convolution layer to obtain a feature tensor of the training data with negative samples;
a weighting subunit configured to perform weighted calculation on the feature tensor of the training data with negative samples through the second-order pooling layer to obtain a weighted feature tensor of the training data with negative samples;
a classification subunit configured to classify the weighted feature tensor of the training data with negative samples through the fully-connected layer to obtain the discrimination result of the training data with negative samples;
a second output subunit configured to output the discrimination result of the training data with negative samples.

Optionally, the weighting subunit includes:
a dimensionality reduction subunit configured to perform channel dimensionality reduction on the feature tensor of the training data with negative samples;
a first calculation subunit configured to calculate covariance information between any two channels in the feature tensor after the channel dimension reduction to obtain a covariance matrix;
a convolution subunit configured to perform grouping convolution and 1×1×1 convolution calculation on the covariance matrix to obtain a weight vector, here the number of channels of the weight vector is the same as the number of channels of the feature tensor of the training data with negative samples;
a second calculation subunit configured to calculate an inner product of the weight vector and the feature tensor of the training data with negative samples to obtain the weighted feature tensor of the training data with negative samples.

Optionally, the training module 61 further includes:
an initialization unit configured to initialize the network layers in the discriminator that is to be trained;
a compression unit configured to compress a convolution kernel of the convolution layer and a weight matrix of the fully-connected layer by means of tensor decomposition.

Optionally, the acquisition unit 611 includes:
an original comparison data acquisition subunit configured to acquire original comparison data, here the original comparison data includes real original data with positive samples and real original data with negative samples;
a normalization processing subunit configured to normalize the real original data with positive samples and the real original data with negative samples, determine the normalized real original data with positive samples as the real training data with positive samples, and determine the normalized real original data with negative samples as the real training data with negative samples, here each of voxel values of the real training data with positive samples and the real training data with negative samples is within a preset numerical range.

It can be seen from the above that, in the embodiments of the present application, the image feature visualization apparatus improves the traditional GAN, and improves the traditional generator into the mapping generator including the mapping module, which is configured to learn the key feature map that distinguishes the real training data with positive samples and the real training data with negative samples during training, so that the features of the input medical image can be extracted during applications, so as to realize the feature visualization of the medical image. In the training process, through continuous generative adversarial training and improvement of the extraction accuracy of the mapping generator, so that the features of the medical image can be better extracted and the quality of the visualization result of the medical image can be improved when the mapping generator in the GAN is applied; at the same time, the network parameters of the convolutional layer and the fully-connected layer in the discriminator are compressed by means of the tensor-train decomposition, so as to retain the spatial information and the time series information of the input data during the training, to achieve a regularization effect while reducing parameters and saving storage space, to avoid over-fitting of the GAN, and to enhance generalization ability of the GAN; further, the second-order pooling layer in the discriminator is used to intelligently extract more discriminative features under the action of the self-attention mechanism to improve the discriminative ability of the discriminator; further, through adding the regularization constraint of the mapping module to the loss function of the mapping generator, the mapping generator can visualize the features of irregularly shapes more accurately.

Third Embodiment

Figure 7:
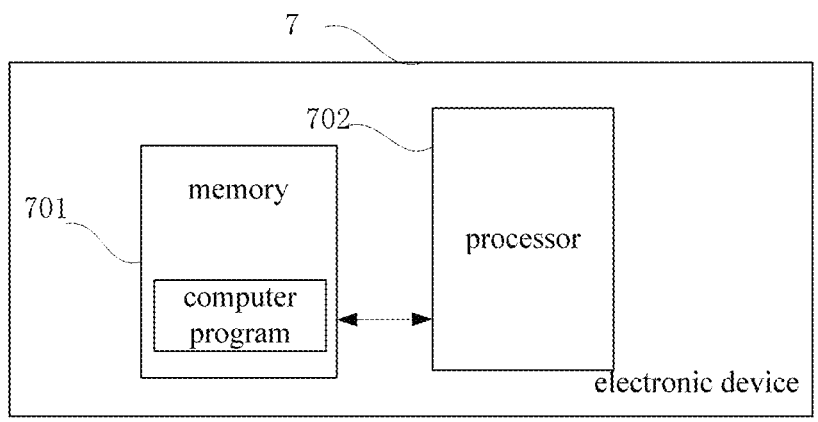
FIG. 7 is a schematic structural diagram of the electronic device provided by an embodiment of the present application.

A third embodiment of the present application provides an electronic device. Please refer to FIG. 7, the electronic device 7 in this embodiment of the present application includes: a memory 701, one or more processors 702 (only one is shown in FIG. 7) and a computer program stored in the memory 701 and executable on the processor. Among them, the memory 701 stores a software program and a module, and the processor 702 executes functional applications and data processing through executing the software programs and units stored in the memory 701, so as to obtain a resource corresponding to the preset event. Specifically, the processor 702, when executing the computer program stored in the memory 701, implements the following steps of:
- acquiring training comparison data, here the training comparison data includes real training data with positive samples and real training data with negative samples;
- inputting the real training data with positive samples into a mapping generator that is to be trained to obtain fictitious training data with negative samples output by the mapping generator that is to be trained, here the mapping generator includes a mapping module configured to learn a key feature map that distinguishes the real training data with positive samples and the real training data with negative samples, and the fictitious training data with negative samples is generated by the mapping generator based on the real training data with positive samples and the key feature map;
- inputting training data with negative samples into a discriminator that is to be trained to obtain a discrimination result output by the discriminator, here the training data with negative samples includes the real training data with negative samples and the fictitious training data with negative samples;
- optimizing the mapping generator that is to be trained and the discriminator that is to be trained based on the discrimination result, and returning to execute the step of acquiring the training comparison data and subsequent steps until training is completed.
- inputting a target image that is to be processed into the trained mapping generator, and extracting features of the target image through the mapping module in the trained mapping generator, so as to realize feature visualization of the target image.

Assuming that the above description is the first possible implementation, then in a second possible implementation provided on the basis of the first possible implementation, the mapping module includes an encoder and a decoder, and the step of inputting the real training data with positive samples into the mapping generator that is to be trained to obtain the fictitious training data with negative samples output by the mapping generator that is to be trained includes:
- compressing the real training data with positive samples into a feature vector through a convolution operation of the encoder;
- decoding the feature vector through the decoder to obtain the key feature map that distinguishes the real training data with positive samples and the real training data with negative sample;
- generating the fictitious training data with negative samples based on the key feature map and the real training data with positive samples;
- outputting the fictitious training data with negative samples.

In a third possible implementation provided on the basis of the second possible implementation, the step of generating the fictitious training data with negative samples based on the key feature map and the real training data with positive samples includes:
- adding each of voxel values of the key feature map to one corresponding voxel value in the real training data with positive samples respectively to obtain the fictitious training data with negative samples.

In a fourth possible implementation provided on the basis of one of the above possible implementation, network layers of the discriminator include a convolutional layer, a second-order pooling layer, and a fully-connected layer, and the step of inputting the training data with negative samples into the discriminator that is to be trained to obtain the discrimination result output by the discriminator includes:
- inputting a tensorizing expression of the training data with negative samples into the discriminator that is to be trained;
- performing feature extraction on the tensorizing expression of the training data with negative samples through the convolution layer to obtain a feature tensor of the training data with negative samples;
- performing weighted calculation on the feature tensor of the training data with negative samples through the second-order pooling layer to obtain a weighted feature tensor of the training data with negative samples;
- classifying the weighted feature tensor of the training data with negative samples through the fully-connected layer to obtain the discrimination result of the training data with negative samples;
- outputting the discrimination result of the training data with negative samples.

In a fifth possible implementation provided on the basis of the fourth possible implementation, the step of performing weighted calculation on the feature tensor of the training data with negative samples through the second-order pooling layer to obtain a weighted feature tensor of the training data with negative samples includes:
- performing channel dimensionality reduction on the feature tensor of the training data with negative samples;
- calculating covariance information between any two channels in the feature tensor after the channel dimension reduction to obtain a covariance matrix;
- performing grouping convolution and 1×1×1 convolution calculation on the covariance matrix to obtain a weight vector, here the number of channels of the weight vector is the same as the number of channels of the feature tensor of the training data with negative samples;
- calculating an inner product of the weight vector and the feature tensor of the training data with negative samples to obtain the weighted feature tensor of the training data with negative samples.

In a sixth possible implementation provided on the basis of the fourth possible implementation, before the step of inputting the training data with negative samples into the discriminator that is to be trained to obtain the discrimination result output by the discriminator, the processor 702, when executing the computer program stored in the memory 701, further implements the following steps of:

initializing the network layers in the discriminator that is to be trained;

compressing a convolution kernel of the convolution layer and a weight matrix of the fully-connected layer by means of tensor decomposition.

In a seventh possible implementation provided on the basis of the first possible implementation, the step of acquiring the training comparison data includes:

acquiring original comparison data, here the original comparison data includes real original data with positive samples and real original data with negative samples;

normalizing the real original data with positive samples and the real original data with negative samples, determining the normalized real original data with positive samples as the real training data with positive samples, and determining the normalized real original data with negative samples as the real training data with negative samples, here each of voxel values of the real training data with positive samples and the real training data with negative samples is within a preset numerical range.

It should be appreciated that, in the embodiments of the present application, the so-called processor 702 may be a CPU (Central Processing Unit), and the processor may also be other general-purpose processor, DSP (Digital Signal Processor), ASIC (Application Specific Integrated Circuit), FPGA (Field-Programmable Gate Array), or other programmable logic unit, discrete gate unit, transistor logic unit, discrete hardware component, or the like. The general-purpose processor may be micro-processor, or the processor may be any conventional processor, and the like.

The memory 701 may include only read-only memory and random access memory, and provide instructions and data to the processor 702. A part or all of the memory 701 may further include non-volatile random access memory. For example, the memory 701 may further store information on a type of a device.

It can be seen from the above that, in the embodiments of the present application, the traditional GAN is improved, and the traditional generator is improved into the mapping generator including the mapping module, which is configured to learn the key feature map that distinguishes the real training data with positive samples and the real training data with negative samples during training, so that the features of the input medical image can be extracted during applications, so as to realize the feature visualization of the medical image. In the training process, through continuous generative adversarial training and improvement of the extraction accuracy of the mapping generator, so that the features of the medical image can be better extracted and the quality of the visualization result of the medical image can be improved when the mapping generator in the GAN is applied; at the same time, the network parameters of the convolutional layer and the fully-connected layer in the discriminator are compressed by means of the tensor-train decomposition, so as to retain the spatial information and the time series information of the input data during the training, to achieve a regularization effect while reducing parameters and saving storage space, to avoid over-fitting of the GAN, and to enhance generalization ability of the GAN; further, the second-order pooling layer in the discriminator is used to intelligently extract more discriminative features under the action of the self-attention mechanism to improve the discriminative ability of the discriminator; further, through adding the regularization constraint of the mapping module to the loss function of the mapping generator, the mapping generator can visualize the features of irregularly shapes more accurately.

It will be clearly understood by those skilled in the art that, for convenience and brevity of description, the division of the various functional units or modules described above is only exemplified. In practical applications, the above functions may be completed through assigning it to different functional units or modules according to needs. That is, the internal structure of the apparatus is divided into different functional units or modules to perform all or part of the functions described above. The various functional units or modules in the embodiments may be integrated into one processing unit, or each of the units may exist physically separately, or two or more units may be integrated into one unit. The above integrated unit may be implemented in a form of hardware, or may be implemented in a form of software functional unit. In addition, the specific names of the respective functional units or modules are only for the purpose of facilitating mutual differentiation, and are not intended to limit the protection scope of the present application. In the specific working process of the units or the modules in the foregoing system, reference may be made to the corresponding process in the foregoing method embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary units and algorithm steps described in combination with the embodiments disclosed herein may be implemented by electronic hardware, or a combination of software of en external device and electronic hardware. Whether these functions are performed in hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus and method may be implemented in other manners. For example, the apparatus embodiments described above are merely illustrative. For example, the division of the modules or units is only a division for logical functions, and there may be other division manners in actual implementation, for example, a plurality of units or components may be combined or integrated into another system, or some features may be ignored or not executed. In addition, the mutual coupling or direct coupling or communication connection as shown or discussed may be indirect coupling or communication connection through some interfaces, devices or units, or may be electrical or mechanical, or may be in other forms.

The units described as separate components may or may not be physically separate. The components displayed as units may or may not be physical units, that is, may be located in one place, or may be distributed to a plurality of network units. Some or all of the units may be selected according to actual needs to achieve the purpose of the solutions of the embodiments.

The integrated unit, if implemented in the form of the software functional unit and sold or used as a stand-alone product, may be stored in a computer readable storage medium. Based on such understanding, the present application may implement all or part of the processes in the above embodiments through commanding related hardware by a computer program, and the computer program may be stored in the computer readable storage medium. The computer program, when executed by the processor, may implement the steps of the various method embodiments described above. Where, the computer program includes a computer program code, and the computer program code may be in a form of a source code, an object code, an executable file, or some intermediate forms. The computer readable medium may include: any entity or apparatus capable of carrying the computer program code, a recording medium, a USB flash disk, a removable hard disk, a magnetic disk, an optical disk, a computer-readable memory, a read-only memory (ROM), a random access memory (RAM), an electrical carrier signal, a telecommunication signal, or software distribution media or the like. It should be noted that, the content contained in the computer-readable storage medium may be appropriately increased or decreased according to requirements of legislation and patent practice in a jurisdiction. For example, in some jurisdictions, according to the legislation and the patent practice, the computer-readable storage medium does not include the electrical carrier signal and telecommunication signal.

The above embodiments are only used to illustrate the technical solutions of the present application, and are not intended to be limiting. Although the present application has been described in detail with reference to the foregoing embodiments, those of ordinary skill in the art should understand that the technical solutions disclosed in the above embodiments may be modified, or some of the technical features may be replaced by equivalents. These modifications or substitutions do not depart corresponding technical solutions from the spirit and scope of the technical solutions of the embodiments of the present application, and should be included in the protection scope of the present application.

What is claimed is:

1. An image feature visualization method, comprising:
   acquiring training comparison data, wherein the training comparison data comprises real training data with positive samples and real training data with negative samples;
   inputting the real training data with positive samples into a mapping generator that is to be trained to obtain fictitious training data with negative samples output by the mapping generator that is to be trained, wherein the mapping generator comprises a mapper configured to learn a key feature map that distinguishes the real training data with positive samples and the real training data with negative samples, and the fictitious training data with negative samples is generated by the mapping generator based on the real training data with positive samples and the key feature map;
   inputting training data with negative samples into a discriminator that is to be trained to obtain a discrimination result output by the discriminator, wherein the training data with negative samples comprises the real training data with negative samples and the fictitious training data with negative samples;
   optimizing the mapping generator that is to be trained and the discriminator that is to be trained based on the discrimination result, and returning to execute the step of acquiring the training comparison data and the subsequent steps until training is completed; and
   inputting a target image that is to be processed into the trained mapping generator, and extracting features of the target image through the mapper in the trained mapping generator, so as to realize feature visualization of the target image;
   wherein the discriminator operates using network layers comprising a convolutional layer, a second-order pooling layer, and a fully-connected layer, and the step of inputting the training data with negative samples into the discriminator that is to be trained to obtain the discrimination result output by the discriminator comprises: inputting a tensorizing expression of the training data with negative samples into the discriminator that is to be trained;
   performing feature extraction on the tensorizing expression of the training data with negative samples through the convolution layer to obtain a feature tensor of the training data with negative samples;
   performing weighted calculation on the feature tensor of the training data with negative samples through the second-order pooling layer to obtain a weighted feature tensor of the training data with negative samples;
   classifying the weighted feature tensor of the training data with negative samples through the fully-connected layer to obtain the discrimination result of the training data with negative samples; and
   outputting the discrimination result of the training data with negative samples.

2. The image feature visualization method of claim 1, wherein the mapper comprises an encoder and a decoder, and the step of inputting the real training data with positive samples into the mapping generator that is to be trained to obtain the fictitious training data with negative samples output by the mapping generator that is to be trained comprises:
   compressing the real training data with positive samples into a feature vector through a convolution operation of the encoder;
   decoding the feature vector through the decoder to obtain the key feature map that distinguishes the real training data with positive samples and the real training data with negative sample;
   generating the fictitious training data with negative samples based on the key feature map and the real training data with positive samples; and
   outputting the fictitious training data with negative samples.

3. The image feature visualization method of claim 2, wherein the step of generating the fictitious training data with negative samples based on the key feature map and the real training data with positive samples comprises:
   adding each of voxel values of the real training data with positive samples to a voxel value of the key feature map respectively to obtain the fictitious training data with negative samples.

4. The image feature visualization method of claim 1, wherein the step of performing weighted calculation on the feature tensor of the training data with negative samples through the second-order pooling layer to obtain the weighted feature tensor of the training data with negative samples comprises:
   performing channel dimensionality reduction on the feature tensor of the training data with negative samples;
   calculating covariance information between any two channels in the feature tensor after the channel dimension reduction to obtain a covariance matrix;
   performing grouping convolution and 1×1×1 convolution calculation on the covariance matrix to obtain a weight vector, wherein the number of channels of the weight vector is the same as the number of channels of the feature tensor of the training data with negative samples; and calculating an inner product of the weight vector and the feature tensor of the training data with negative samples to obtain the weighted feature tensor of the training data with negative samples.

5. The image feature visualization method of claim 1, wherein, before the step of inputting the training data with negative samples into the discriminator that is to be trained to obtain the discrimination result output by the discriminator, the image feature visualization method comprises:

initializing the network layers in the discriminator that is to be trained; and compressing a convolution kernel of the convolution layer and a weight matrix of the fully-connected layer by means of tensor decomposition.

6. The image feature visualization method of claim 1, wherein the step of acquiring the training comparison data comprises:

acquiring original comparison data, wherein the original comparison data includes real original data with positive samples and real original data with negative samples; and normalizing the real original data with positive samples and the real original data with negative samples, determining the normalized real original data with positive samples as the real training data with positive samples, and determining the normalized real original data with negative samples as the real training data with negative samples, wherein each of voxel values of the real training data with positive samples and the real training data with negative samples is within a preset numerical range.

7. An electronic device, comprising a memory, a processor, and a computer program stored in the memory and executable on the processor, wherein the processor, when executing the computer program, implements operations comprising:

acquiring training comparison data, wherein the training comparison data comprises real training data with positive samples and real training data with negative samples;

inputting the real training data with positive samples into a mapping generator that is to be trained to obtain fictitious training data with negative samples output by the mapping generator that is to be trained, wherein the mapping generator comprises a mapper configured to learn a key feature map that distinguishes the real training data with positive samples and the real training data with negative samples, and the fictitious training data with negative samples is generated by the mapping generator based on the real training data with positive samples and the key feature map;

inputting training data with negative samples into a discriminator that is to be trained to obtain a discrimination result output by the discriminator, wherein the training data with negative samples comprises the real training data with negative samples and the fictitious training data with negative samples;

optimizing the mapping generator that is to be trained and the discriminator that is to be trained based on the discrimination result, and returning to execute the step of acquiring the training comparison data and the subsequent steps until training is completed; and inputting a target image that is to be processed into the trained mapping generator, and extracting features of the target image through the mapper in the trained mapping generator, so as to realize feature visualization of the target image;

wherein the discriminator comprises network layers including a convolutional layer, a second-order pooling layer, and a fully-connected layer, and inputting the training data with negative samples into the discriminator that is to be trained to obtain the discrimination result output by the discriminator comprises:

inputting a tensorizing expression of the training data with negative samples into the discriminator that is to be trained;

performing feature extraction on the tensorizing expression of the training data with negative samples through the convolution layer to obtain a feature tensor of the training data with negative samples;

performing weighted calculation on the feature tensor of the training data with negative samples through the second-order pooling layer to obtain a weighted feature tensor of the training data with negative samples;

classifying the weighted feature tensor of the training data with negative samples through the fully-connected layer to obtain the discrimination result of the training data with negative samples;

outputting the discrimination result of the training data with negative samples.

8. The electronic device of claim 7, wherein the mapper comprises an encoder and a decoder, and the step of inputting the real training data with positive samples into the mapping generator that is to be trained to obtain the fictitious training data with negative samples output by the mapping generator that is to be trained comprises:

compressing the real training data with positive samples into a feature vector through a convolution operation of the encoder;

decoding the feature vector through the decoder to obtain the key feature map that distinguishes the real training data with positive samples and the real training data with negative sample;

generating the fictitious training data with negative samples based on the key feature map and the real training data with positive samples;

outputting the fictitious training data with negative samples.

9. The electronic device of claim 8, wherein the step of generating the fictitious training data with negative samples based on the key feature map and the real training data with positive samples comprises:

adding each of voxel values of the real training data with positive samples to a voxel value of the key feature map respectively to obtain the fictitious training data with negative samples.

10. The electronic device of claim 7, wherein the step of performing weighted calculation on the feature tensor of the training data with negative samples through the second-order pooling layer to obtain the weighted feature tensor of the training data with negative samples comprises:

performing channel dimensionality reduction on the feature tensor of the training data with negative samples;

calculating covariance information between any two channels in the feature tensor after the channel dimension reduction to obtain a covariance matrix;

performing grouping convolution and 1×1×1 convolution calculation on the covariance matrix to obtain a weight vector, wherein the number of channels of the weight vector is the same as the number of channels of the feature tensor of the training data with negative samples; and calculating an inner product of the weight vector and the feature tensor of the training data with negative samples to obtain the weighted feature tensor of the training data with negative samples.

11. The electronic device of claim 7, wherein, before inputting the training data with negative samples into the discriminator that is to be trained to obtain the discrimination result output by the discriminator, the processor, when executing the computer program, further implements the step of:

initializing the network layers in the discriminator that is to be trained; and compressing a convolution kernel of the convolution layer and a weight matrix of the fully-connected layer by means of tensor decomposition.

12. The electronic device of claim 7, wherein acquiring the training comparison data comprises:

acquiring original comparison data, here the original comparison data includes real original data with positive samples and real original data with negative samples; and normalizing the real original data with positive samples and the real original data with negative samples, determining the normalized real original data with positive samples as the real training data with positive samples, and determining the normalized real original data with negative samples as the real training data with negative samples, wherein each of voxel values of the real training data with positive samples and the real training data with negative samples is within a preset numerical range.

* * * * *